(12) United States Patent
Heinzelmaier et al.

(10) Patent No.: US 11,976,997 B2
(45) Date of Patent: May 7, 2024

(54) INSPECTION METHOD FOR INSPECTING A CONDITION OF AN EXTERNALLY INVISIBLE COMPONENT OF A DEVICE USING A BORESCOPE

(71) Applicant: MTU Aero Engines AG, Munich (DE)

(72) Inventors: Christian Heinzelmaier, Puchheim (DE); Bernd Kriegl, Olching (DE)

(73) Assignee: MTU Aero Engines AG, Munich (DE)

( * ) Notice: Subject to any disclaimer, the term of this patent is extended or adjusted under 35 U.S.C. 154(b) by 39 days.

(21) Appl. No.: 16/972,736

(22) PCT Filed: Jun. 11, 2019

(86) PCT No.: PCT/DE2019/000160
§ 371 (c)(1),
(2) Date: Dec. 7, 2020

(87) PCT Pub. No.: WO2019/238152
PCT Pub. Date: Dec. 19, 2019

(65) Prior Publication Data
US 2021/0262895 A1     Aug. 26, 2021

(30) Foreign Application Priority Data

Jun. 14, 2018 (DE) .......................... 102018209609.0

(51) Int. Cl.
*G01M 15/02* (2006.01)
*F01D 21/00* (2006.01)
*G01M 15/14* (2006.01)

(52) U.S. Cl.
CPC ........... *G01M 15/02* (2013.01); *F01D 21/003* (2013.01); *G01M 15/14* (2013.01); *F05D 2260/80* (2013.01); *F05D 2260/83* (2013.01)

(58) Field of Classification Search
CPC ... G01M 15/02; G01M 15/14; F05D 2260/80; F05D 2260/83
See application file for complete search history.

(56) References Cited

U.S. PATENT DOCUMENTS

| 4,139,822 A | 2/1979 | Ulrich et al. |
| 5,301,061 A | 4/1994 | Nakada et al. |
| (Continued) | | |

FOREIGN PATENT DOCUMENTS

| DE | 19757912 B4 | 11/2005 |
| DE | 102006048791 A1 | 4/2008 |
| (Continued) | | |

OTHER PUBLICATIONS

See Search Report of PCT/DE2019/000160 dated Jan. 13, 2020.

*Primary Examiner* — Eric S. McCall
(74) *Attorney, Agent, or Firm* — Davidson Kappel LLC

(57) ABSTRACT

Disclosed is a borescope-based inspection method for inspecting a condition of an externally invisible component of a device, in which method a change in the microstructure of the component material is determined based on a physical property and evaluated in relation to at least one reference physical value that accounts for aging of the component. Also disclosed is a system having a computing unit and at least one probe for performing such an inspection method for selecting, with the aid of or, in particular, by a computer, a non-destructive testing method for measuring the physical property and for actually measuring the physical property, for performing a comparison between a measured value and the reference value and for performing an evaluation of a tolerance between the measured value and the reference value.

7 Claims, 3 Drawing Sheets

(56) References Cited

U.S. PATENT DOCUMENTS

| | | |
|---|---|---|
| 6,031,566 A | 2/2000 | Leo et al. |
| 2003/0135310 A1* | 7/2003 | Bangert ............... G06Q 10/06 340/945 |
| 2004/0051525 A1 | 3/2004 | Hatcher et al. |
| 2012/0158319 A1 | 6/2012 | Hunter et al. |
| 2012/0222474 A1* | 9/2012 | Plonka ............... F02D 41/1458 73/114.69 |
| 2014/0185912 A1* | 7/2014 | Lim ...................... G06T 7/001 382/141 |
| 2014/0207874 A1 | 7/2014 | Soorianarayanan et al. |
| 2014/0208163 A1 | 7/2014 | Domke et al. |
| 2014/0260755 A1 | 9/2014 | Dong et al. |
| 2014/0360289 A1 | 12/2014 | Georgeson et al. |
| 2015/0035969 A1* | 2/2015 | Kobayashi ........ G02B 23/2476 348/82 |
| 2015/0036127 A1* | 2/2015 | Konomura ............. F01D 5/005 356/237.2 |
| 2015/0036150 A1* | 2/2015 | Kobayashi ........... A61B 1/0005 356/614 |
| 2015/0094931 A1* | 4/2015 | Kuschke ................ F02C 9/00 701/102 |
| 2015/0192499 A1 | 7/2015 | Piol et al. |
| 2017/0006201 A1 | 1/2017 | Segura et al. |
| 2017/0097323 A1* | 4/2017 | D'Souza ............... G01N 29/14 |
| 2017/0241286 A1 | 8/2017 | Roberts et al. |
| 2017/0261399 A1 | 9/2017 | Almstedt et al. |
| 2018/0155060 A1* | 6/2018 | Dauenhauer ............ B64F 5/40 |
| 2018/0224353 A1* | 8/2018 | Gysling ............... G01M 5/0016 |
| 2018/0328221 A1* | 11/2018 | Hagen .................. F01D 21/003 |
| 2018/0364037 A1* | 12/2018 | Singh .................... G01B 15/02 |
| 2019/0064080 A1* | 2/2019 | Glover ............... G02B 23/2484 |
| 2019/0120720 A1* | 4/2019 | Fernando ............. G01M 15/14 |
| 2019/0168787 A1* | 6/2019 | Messinger ............ B61L 27/53 |
| 2019/0172191 A1* | 6/2019 | Finn .................... G01M 5/0033 |
| 2019/0172277 A1* | 6/2019 | Cheng ...................... B64F 5/60 |
| 2019/0228514 A1* | 7/2019 | Hestand .................. G06T 7/62 |
| 2020/0090315 A1* | 3/2020 | Jandhyala ........... G01M 5/0033 |
| 2020/0180084 A1* | 6/2020 | Lipkin .................. F01D 21/003 |
| 2020/0319119 A1* | 10/2020 | Peters .................. F01D 21/003 |
| 2020/0324919 A1* | 10/2020 | Drayton .............. G01N 21/954 |
| 2020/0333294 A1* | 10/2020 | Tapia ....................... G01B 7/14 |
| 2020/0346310 A1* | 11/2020 | Huttner ................ B23Q 9/0007 |
| 2021/0108536 A1* | 4/2021 | Trivedi ................. F01D 25/285 |
| 2021/0156563 A1* | 5/2021 | Binek ................... B33Y 40/20 |
| 2021/0355854 A1* | 11/2021 | Grasreiner ............. F01N 11/00 |

FOREIGN PATENT DOCUMENTS

| | | |
|---|---|---|
| DE | 112014000505 T5 | 11/2015 |
| DE | 102016203904 A1 | 9/2017 |
| DE | 102016224049 A1 | 6/2018 |
| EP | 3171166 A1 | 5/2017 |
| GB | 2487930 A | 8/2012 |
| JP | H07270261 A | 10/1995 |
| WO | WO2014105298 A1 | 7/2014 |
| WO | WO2015183431 A1 | 12/2015 |

* cited by examiner

INSPECTION METHOD FOR INSPECTING A CONDITION OF AN EXTERNALLY INVISIBLE COMPONENT OF A DEVICE USING A BORESCOPE

The present invention relates to an inspection method, and to a system for carrying out such an inspection method.

BACKGROUND

Devices such as prime movers (e.g., turbomachines) are typically equipped with a variety of sensors, such as temperature sensors and vibration sensors), for monitoring the condition of hidden components inside the machine. If, for example, a temperature sensor in a high-pressure turbine detects a so-called overtemperature, then, in the case of aircraft engines, a corresponding warning is issued in the cockpit. In order to check whether the aircraft engine has been damaged by the overtemperature, the engine is removed from the wing and dismantled to the component level. Then, a destructive metallographic microstructure analysis is performed on the first high-pressure turbine stage. The change in the microstructure of the high-pressure turbine rotor blade is evaluated at three locations based on standard micrographs. To account for normal aging-related effects on the microstructure, a micrograph from non-overheated regions of the blade under inspection, such as the blade root, is also included in the evaluation to assess the changes in the middle of the blade. If unacceptable damage to the component is detected, all of the rotor blades of this stage have to be replaced, and the inspection is continued for a subsequent turbine stage. However, it was found that in about 80% of the cases, the overtemperature did not cause damage to the rotor blade material.

SUMMARY OF THE INVENTION

It is an object of the invention to provide an inspection method that requires less time and effort for inspection. Another object of the invention is to provide a system suitable for carrying out the method.

An inventive inspection method for inspecting a condition of an externally invisible component, and in particular, of an externally inaccessible component or component region of a device, provides for the use of a borescope. In a first step, a non-destructive testing method is used to measure a physical property of at least one component region. In a subsequent step, a comparison is made between a measured physical value obtained using the non-destructive testing method and a reference physical value of the component region. The reference value is read from a database and accounts for aging of the component. In a further step, an evaluation is made of a deviation of the measured value from the reference value.

The inventive inspection method makes a reliable and clear decision as to whether it is necessary to perform a costly and time-consuming conventional inspection, such as opening of the device and, for example, destructive metallographic examination of the material of individual components. It has been discovered that a change in the microstructure of the component or component material can be detected not only by metallographic examination or, more generally, by materialographic examination, but rather that the microstructural change also affects physical properties of the component, which can be detected using suitable physical measurement methods. The term "materialographic examination" includes also micrographic examinations of non-metallic components, such as, for example, components made of fiber-reinforced composite plastic, and thus includes the term "metallographic examination," which, according to the meaning of the word, only includes examinations of metallic components. A borescope-based, non-destructive examination of the change in one or more physical properties allows the component to be inspected with the device in the closed condition, and thus on the installed device. This avoids unnecessary disassembly of the device. Accounting for aging ensures that a reliable examination result can be obtained since a deviation in the respectively measured physical property is not related to a new part which, of course, does not have any signs of aging, but to a part that has been in service and has the same, or at least a similar, history. Aging of the component or component material is caused, for example, by in-flight temperature events, such as temperature profile and maximum temperature, operating time, operating point of the engine, ETM (Engine Trend Monitoring) data, and the like. The time and effort required for inspection can thus be significantly reduced. Comparison and evaluation are preferably performed in an automated manner, so that a person carrying out the inspection method only needs to choose and suitably position the borescope with a probe. The appropriate testing method may be selected based on criteria such as component material, component accessibility and/or the previous history of the component and may also be proposed to the user in an automated manner, taking these exemplary criteria into account. Examples of devices include prime movers, such as turbomachines, in particular aircraft engines, industrial turbines, power-plant turbines, and marine turbines.

By employing the inspection method of the invention, the time and effort required for inspection is significantly reduced. The inspection method allows faster inspection of a plurality of blades while making it possible to obtain a more reliable examination result, and thus a more reliable appraisal of the condition of the respective component. In the case of aircraft engines, this avoids unnecessary shop visits and increases on-wing times.

Preferred non-destructive testing methods include subjecting the at least one component region to a microwave field, an ultrasonic field, X-rays, or to an eddy current. Other alternative or complementary non-destructive testing methods include, but are not limited to, thermographic analysis, vibration and resonance analysis and/or conductivity measurement, in particular electrical conductivity measurement.

For example, to perform an X-ray inspection, the component or components should advantageously be accessible from two sides. For example, the X-ray source may be passed through existing holes, which, in the particular case of turbomachines, may be holes in the combustor, which are used, for example, for fuel injectors, and X-ray detectors may be inserted and reliably positioned through existing borescope ports in the casing of the turbomachine.

When performing an eddy current inspection, it is advantageous, for example, to position the probe in relation to the component so as to reproducibly define the volume of material being measured. In this connection, the probe may be oriented and fixed at the cooling air holes.

Another practical measuring method which may be performed is process compensated resonance testing (PCRT). This resonance analysis allows even relatively small local changes in the component to be detected using a special radio-frequency measuring technique and special analysis software.

When performing an electrical conductivity measurement, in order to define the current path through the component, the electrodes may be configured such that current entry and exit are, for example, via the cooling air holes. In particular, when more than two measurement points are used, it is possible to perform a cross measurement, which allows statements to be made about an area.

The aforementioned examples of non-destructive testing methods, namely X-ray inspection, eddy current inspection, resonance testing, and conductivity measurement are practical applications that can be performed on turbine blades in the installed state in turbomachinery.

If the evaluation should reveal that the deviation is within an acceptable tolerance range, one exemplary embodiment provides that the component be assessed as being "OK." The inspection test may then be terminated or repeated for another component region or for another component to increase the certainty and reliability of the examination result.

If the evaluation should reveal that the deviation is outside an acceptable tolerance range, the component is preferably subjected to a destructive materialographic examination. Alternatively, a new non-destructive examination may be performed using an alternative testing method. If the result obtained using the second testing method also reveals an excessive; i.e. unacceptable, deviation of the measured value from the reference value, it is only then that the component is subjected to a destructive materialographic examination. However, if the second examination should reveal an acceptable deviation, a third examination may be performed using a non-destructive testing method different from the first and second testing methods. If the third examination reveals an unacceptable deviation, it is only then that the component is subjected to a destructive materialographic examination. However, if the third examination reveals an acceptable deviation, the component may be assessed as being "OK." These measures make it possible to avoid an unnecessary destructive materialographic examination.

If the evaluation should reveal that the deviation is within an acceptable tolerance range, one exemplary embodiment provides that the aforementioned steps (employing a non-destructive testing method, comparison of values, and evaluation) be repeated at least once for the previously examined, at least one component region using a different non-destructive testing method. This increases the certainty, the reliability, and the objectivity of the inspection method. As in the case of the first examination, the testing method used for the so-called control examination is preferably selected in an automated manner based on criteria such as component material, component accessibility and/or the previous history of the component, complemented by the criterion that the second testing method differs from the first testing method. In this context, it may be advantageous to also consider the criterion of not using two similar testing methods. For example, if the first testing method concerns the measurement of electrical conductivity, it may be advantageous if, for example, a radiographic examination is performed as the second testing method. The comparison is preferably performed in an automated manner.

If, once the aforementioned steps (employing a non-destructive testing method, comparison of values, and evaluation) have been performed again, the evaluation should reveal that the deviation is within an acceptable tolerance range, one exemplary embodiment provides that the component be assessed as being "OK." The evaluation is preferably performed in an automated manner.

If, once the aforementioned steps (employing a non-destructive testing method, comparison of values, and evaluation) have been performed again, the evaluation should reveal that the deviation is outside an acceptable tolerance range, one exemplary embodiment provides that the device be opened and that the component be subjected to a destructive materialographic examination. Based on the negative result of the control examination, the component is very likely to be defective and probably needs to be replaced.

To appraise the condition of a component region that is inaccessible to a probe of the borescope, one exemplary embodiment provides that the inaccessible component region be assessed as being "OK" if, once the steps a) through c) have been performed again, the evaluation includes determining that the deviation is within an acceptable tolerance range.

Preferably, the non-destructive testing methods to be used are previously calibrated with reference components. The calibration is a preparatory measure and increases the reliability of the actual inspection method. The reference components have, for example, different operating times, different maximum operating temperatures, and the like.

An inventive system adapted to perform an inspection method according to the invention has a computing unit and a probe, and is in particular adapted for automated selection of the non-destructive testing method, for actually measuring the physical property, for automated execution of a comparison between the measured value and the reference value, and for automated evaluation of a tolerance between the measured value and the reference value. The system makes it possible to reliably inspect the condition of a component or component region which is located inside a device and which is not visible externally and in particular not accessible from outside. The system is mobile and preferably portable by a person performing the inspection method, so that it can be quickly taken to particular location of use.

A probe for a system having a computing unit and a probe, which probe is suitable in particular for performing on-wing inspections of engines, is configured in particular in the shape of a gripper including a plurality of links, a main sensor being disposed centrally on the probe. For example, the probe may be configured to be collapsible so as to be maneuvered in a collapsed condition via, for example, borescope ports to thermally highly loaded locations of, for example, turbine blades, such as the leading edge or the center of the gas flow path. A flexible, gripper-like design having a plurality of links allows for opening and optimally embracing the region to be examined of a component, such as the leading edge of an airfoil, even in the case of different geometries. Where necessary, the centrally disposed main sensor may also be adapted to and/or replaced for different engine types or components, such as high-pressure turbine rotor blades. The lateral links serve to stabilize and fix the probe on the component.

In one embodiment of the probe, the lateral links have additional sensors in the form of rigid or movable inspection knobs or heads which are used on turbine blades, for example, to examine regions behind the leading edge (internal structure of the blade) via the pressure and suction sides.

In one embodiment of the probe, the probe is configured to be movable and replaceable, in particular, to perform a plurality of testing methods and to adapt the system to different inspection tasks.

In one embodiment, the probe is disposed on a flexible, rigid, or stiffenable probe guide having integrated signal and/or control lines connecting the probe in particular to the computing unit, and in one embodiment of the probe, a pivotable coupling device is provided for coupling the probe to the probe guide so as to enable the system to be flexibly moved while the inspection method is performed.

In one embodiment of the probe, the coupling device may be equipped with cameras, which may be used, in particular, for purposes of guiding and positioning the probe and/or for carrying out measurements, and for documenting the inspection.

Other advantageous exemplary embodiments of the invention are the subject matter of further dependent claims.

BRIEF DESCRIPTION OF THE DRAWINGS

Preferred exemplary embodiments of the invention are described in greater detail below with reference to highly simplified schematic drawings, in which.

DETAILED DESCRIPTION

Figure 1:
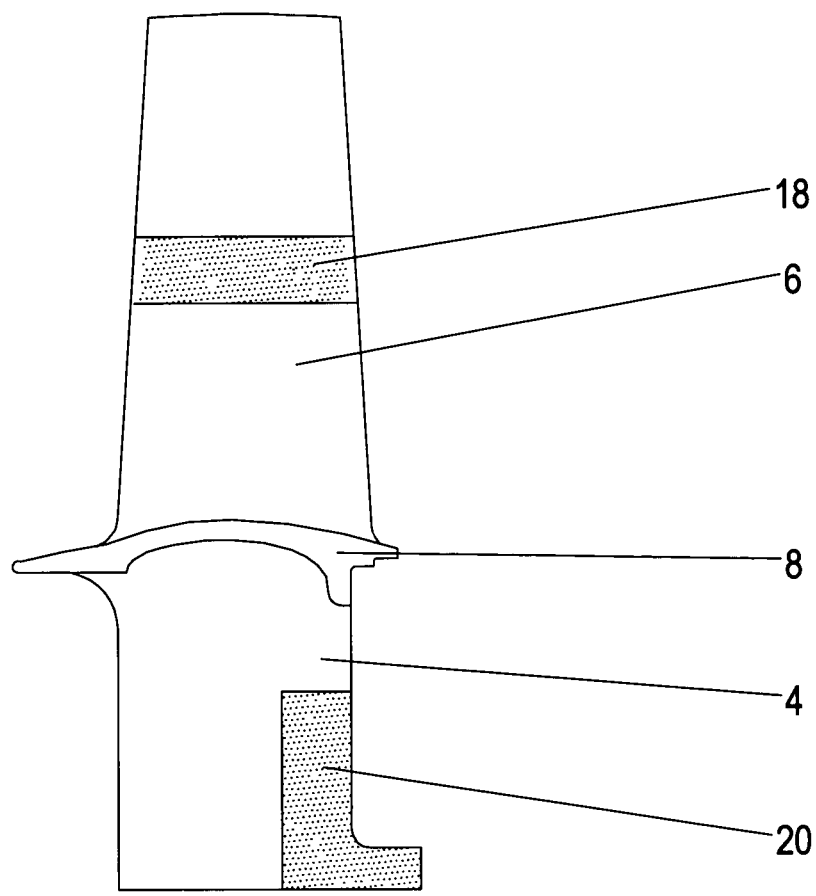
FIG. 1 is a side view of an exemplary component to be inspected.
Figure 2:
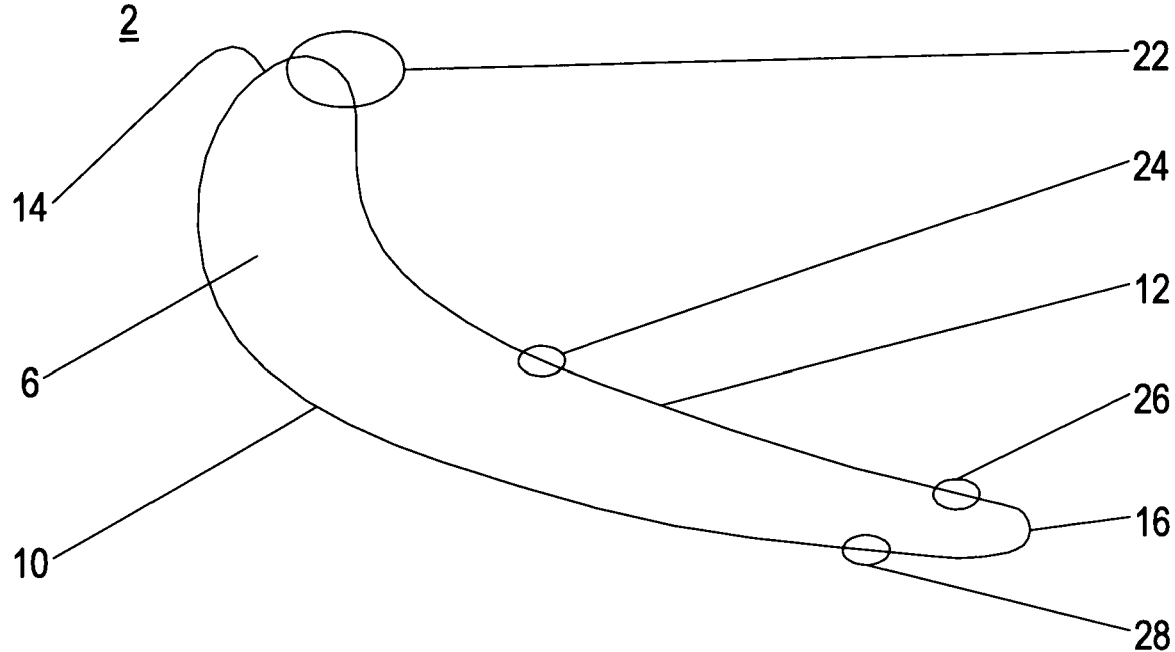
FIG. 2 is a plan view of a portion of the component shown in FIG. 1.
Figure 3:
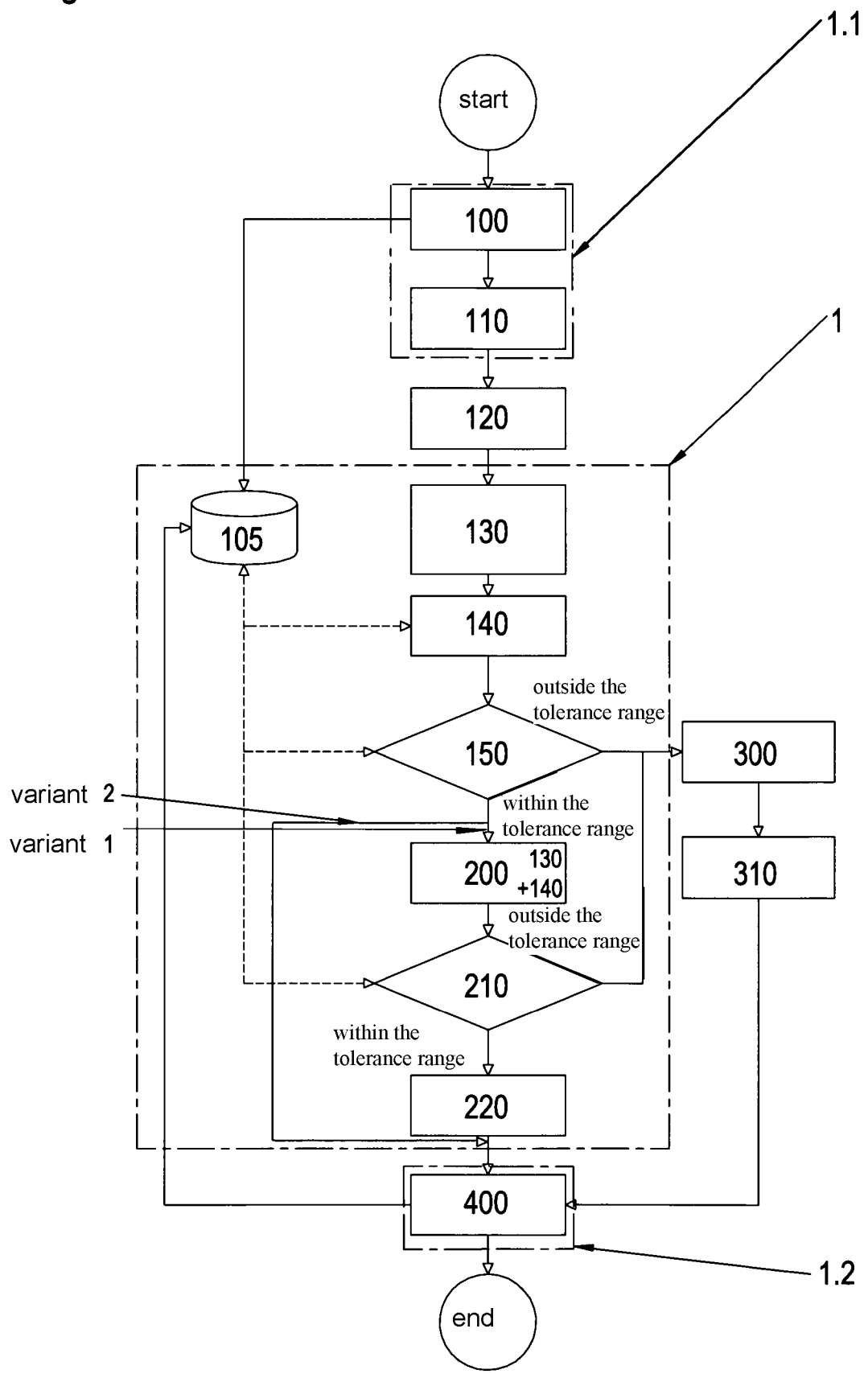
FIG. 3 is a flow diagram of an inspection method according to the invention.

In FIGS. 1 through 3, a preferred exemplary embodiment of an inventive inspection method 1 is described with reference to an exemplary component 2. The exemplary component 2 sketched in FIGS. 1 and 2 is a turbine rotor blade 2 of a turbomachine, such as an aircraft engine. Rotor blade 2 substantially has a blade root 4, an airfoil 6, and a platform 8 disposed between blade root 4 and airfoil 6. Airfoil 6 has a suction side 10 and an opposite pressure side 12, which are joined by a leading edge 14 and a trailing edge 16.

By way of example, the inventive inspection method 1 is to be used in an airfoil-side component portion 18, preferably in a component portion 18 at half the height of the airfoil. To this end, a pressure-side forward component region or inspection region 22 is defined in airfoil-side component portion 18. Component portion 18 and inspection region 22 may be defined in virtually any desired manner as long as they are accessible for a subsequent borescope-based inspection and, in particular, to a probe of a borescope.

FIG. 3 illustrates the sequence of inspection method 1. There is needed a borescope with a system according to the invention. The system has a computing unit and a suitable probe for the borescope. The probe makes it possible to employ the intended non-destructive testing methods. Database 105 may be part of the computing unit, and thus may be a storage medium of the computing unit.

Prior to the start of the actual inspection method 1, preparatory measures 1.1 (steps 100 and 110) are performed, which allow for repeated use of inspection method 1. The preparatory measures are carried out at least once in order to then be able to perform inspection method 1 as often as desired. The preparatory measures essentially include creating a data set including at least reference values and preferably also reference value-related tolerances or tolerance ranges, which, in addition, may be complemented by calibration results of testing methods.

In step 100 (creating a database), a data base 105 is created with reference values of at least the component portions 18 of component 2 in which the inspection regions 22, 24, 26, 28 are defined and which are to be examined for a change in their physical material properties in the context of the inspection method using a borescope. The reference values are obtained from reference components which have been and/or are in service. Moreover, the reference values account for aging of the component material, which is caused, for example, by in-flight temperature events, such as temperature profile and maximum temperature, operating time, operating point of the engine, ETM data, and the like. Each reference value is associated with a tolerance range to be able to determine whether a deviation between the reference value and a measured value of the component or component material in the respective inspection region 22 is acceptable or unacceptable.

In step 110 (calibrating testing methods), possible non-destructive testing methods are then calibrated with the reference component. Non-exhaustive examples of testing methods include measurements of the electrical, magnetic and/or thermal conductivity (eddy current, microwave, and thermography), vibration and resonance analyses, penetration properties (X-rays and ultrasound), a conductivity measurement, and the like. The results of the calibration may also be written into database 105.

With this, the preparatory measures 1.1 for the actual inspection method 1 are complete. In accordance with the invention, as soon as a warning 120 (e.g., overtemperature) is generated by a sensor on the aircraft engine, the inventive inspection method 1 proposes the steps described below.

In step 130 (employing a testing method with the device closed), a non-destructive testing method is selected and a borescope is equipped with a corresponding probe. Preferably, a preferred testing method is proposed to a user by the system. The criteria for the automated selection may include component material, component accessibility and/or the previous history of the component.

In step 140 (comparing between the measured value and the reference value), a comparison is then made between the measured physical value obtained using the non-destructive testing method and an associated reference physical value of component region 22 that is read from the database and, as mentioned above, accounts for aging of component 2 or the material thereof in at least this inspection region 22. The comparison is preferably performed in an automated manner, thereby ensuring maximum possible objectivity.

In step 150 (evaluating a deviation), it is then determined whether the deviation is outside or within the acceptable, reference value-related tolerance range. The evaluation is preferably performed in an automated manner, thereby ensuring maximum possible objectivity.

If the deviation is outside the tolerance range, then, in a step 300 (opening the device), the aircraft engine is removed from the respective aircraft and, in a step 310 (materialographic examination), component 2 is destructively examined metallographically. That is, the aircraft engine is inspected in the conventional manner described above.

If the deviation is within the tolerance range, then, in a step 200 (control examination with the device closed), inspection region 22 is preferably subjected to a control examination to increase certainty and reliability (variant 1). Alternatively, the positive evaluation may be immediately followed by step 400 (writing results into the database) (variant 2). Step 400 (writing results into the database) will be described hereinafter.

During control examination 200 (variant 1), steps 130 (employing a testing method with the device closed) and 140 (comparing between the measured value and the reference value) are repeated using a non-destructive testing method different from the first testing method. As in the case of the first examination, the testing method used for the control examination is preferably selected in an automated manner based on criteria such as component material, component accessibility and/or the previous history of the component, complemented by the criterion that the second testing method differs from the first testing method.

In step 210 (evaluating a deviation), which corresponds to step 150 (evaluating a deviation), it is then determined at the end of control examination 200 whether the deviation is outside or within the acceptable tolerance range that is applicable for the control examination.

If the deviation is outside the tolerance range, the method proceeds with step 300 (opening the device) and the above-described step 310 (materialographic examination).

If the deviation is within the tolerance range, it is determined in a step 220 (component "OK") that the component material in inspection region 22 was not damaged by the overtemperature to the extent that the component could no longer be used. Inspection method 1 is then complete for inspection region 22.

Upon completion of inspection method 1, post-processing 1.2 (step 400) is performed. In step 400 (writing examination results into database 105), the measured values obtained by the non-destructive examinations and also those obtained, where necessary, by the materialographic examinations are entered into database 105 to further account for aging with respect to inspection region 22.

To appraise the material condition of a component portion that is inaccessible to the borescope or its probe, such as, for example, a root-side component portion designated 20 in FIG. 1, inspection method 1 provides that the condition of the inaccessible component portion 20 be assessed as being "OK" if control examination 200 (steps 130, 140 and 210) also reveals that the deviation for an accessible inspection region (inspection region 22 in the example) is within the acceptable tolerance range.

To increase the reliability of inspection method 1, inspection method 1 is preferably performed not only for an inspection region 22, but rather is applied to a plurality of inspection regions 22, 24, 26, 28, as indicated in FIG. 2. In this context, inspection method 1 may be performed for each of inspection regions 22, 24, 26, 28 in isolation from, or in combination with, the other inspection regions 22, 24, 26, 28.

"In isolation from" means that each inspection region 22, 24, 26, 28 is subjected to the first testing method and then to control examination 200 if the deviation of the first examination in forward inspection region 22 was acceptable. It is only then that the method turns to central inspection region 24, then to rearward inspection region 26, and subsequently to suction-side inspection region 28.

"In combination with" means that, first, the first testing method is performed on all inspection regions 22, 24, 26, 28, and if no deviation is outside the respective tolerance range, control examination 200 is performed on inspection regions 22, 24, 26, 28.

The advantage of the isolated procedure is that in each of the inspection regions, the borescope does in principle not need to be moved or repositioned for the first examination and for the control examination. This ensures that the control examination is performed on exactly the same inspection region 22, 24, 26, 28 as the preceding or first examination, which increases the reliability of the measurement results.

The advantage of the combined procedure, as compared to the isolated procedure, is that the probe needs to be changed less frequently because the probe does not need to be changed until the first examination has been performed on all inspection regions 22, 24, 26, 28. On the other hand, however, the borescope, and in particular the probe thereof, must be positionally adjusted twice for each inspection region.

Disclosed is a borescope-based inspection method for inspecting a condition of an externally invisible component of a device, in which method a change in the microstructure of the component material is determined based on a physical property and evaluated in relation to at least one reference physical value that accounts for aging of the component. Also disclosed is a system having a computing unit and at least one probe for performing such an inspection method for selecting, with the aid of or, in particular, by a computer, a non-destructive testing method for measuring the physical property and for actually measuring the physical property, for performing a comparison between a measured value and the reference value and for performing an evaluation of a tolerance between the measured value and the reference value.

Figure 4A:
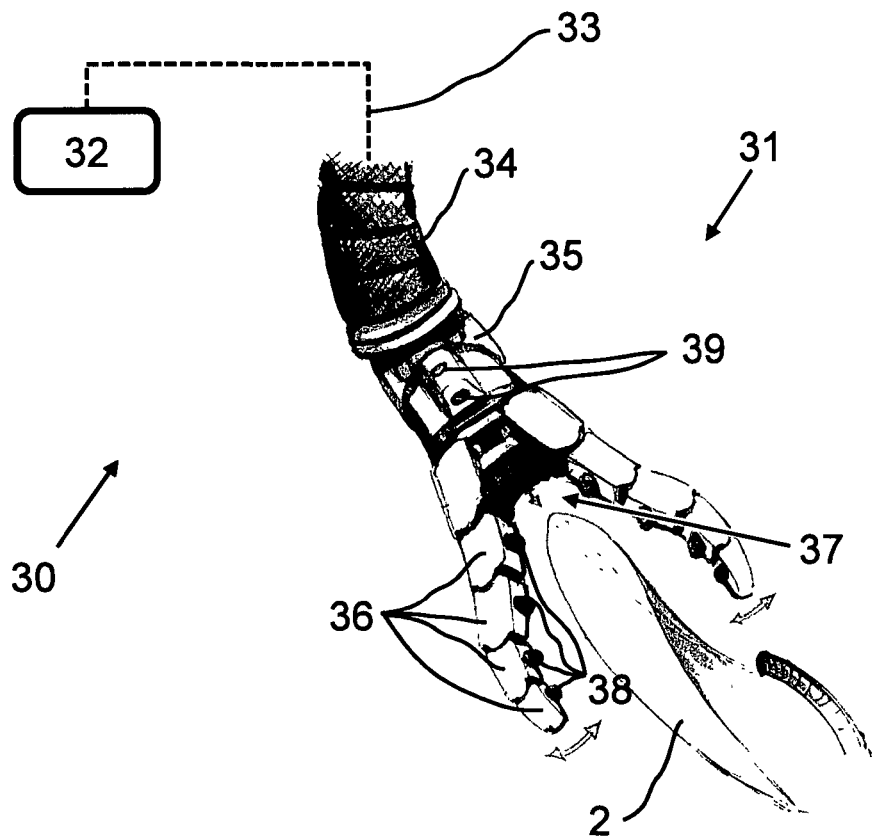
FIGS. 4a and 4b are views showing an exemplary probe of a system according to the invention.
Figure 4B:
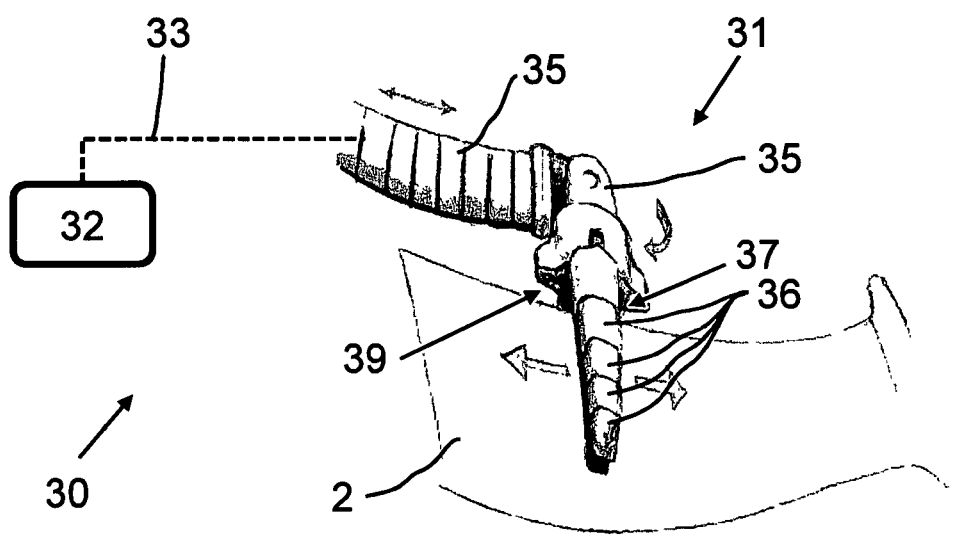

FIGS. 4a and 4b show an exemplary probe 31 of a system 30 according to the invention. The exemplarily illustrated probe 31 is suitable in particular for on-wing inspections of engines. As shown in FIGS. 4a, 4b, probe 31 is connected via a data line 33 to a computing unit 32. When in the collapsed condition, probe 31 may be maneuvered via, for example, borescope ports to thermally highly loaded locations of turbine blades, such as the leading edge or the center of the gas flow path. Its flexible, gripper-like design having a plurality of links 36 allows for opening and optimally embracing the region to be examined of a component 2, such as the leading edge of an airfoil, even in the case of different geometries. Centrally disposed is a main sensor 37, for example, for inspecting the leading edge of an airfoil. Where necessary, main sensor 37 may also be adapted to and/or replaced for different engine types or components 2, such as high-pressure turbine rotor blades. Lateral links 36 serve to stabilize and fix probe 31 on component 2. However, the lateral links may also have additional sensors in the form of rigid or movable inspection knobs or heads 38 which are used, for example, on turbine blades to examine regions behind the leading edge (internal structure of the blade) via the pressure and suction sides.

The movable and replaceable probe 31 is disposed on a flexible, rigid, or stiffenable probe guide 34 having integrated signal and/or control lines 33 connecting probe 31 to computing unit 32. For purposes of coupling probe 31 to probe guide 34, a pivotable coupling device 35 may be provided, which may be equipped with cameras 39 for guiding and positioning probe 31, for carrying out measurements, and for documenting the inspection.

LIST OF REFERENCE NUMERALS 1 inspection method
2 component/blade
4 blade root
6 airfoil
8 platform
10 suction side
12 pressure side
14 leading edge
16 trailing edge
18 airfoil-side component portion
20 root-side component portion
22 forward component region/inspection region
24 central component region/inspection region
26 rearward component region/inspection region 28 suction-side component region/inspection region
30 system
31 probe
32 computing unit
33 data line
34 probe guide
35 coupling device
36 links
37 main sensor
38 inspection knob or head
39 camera
100 creating a database
105 database
110 calibrating testing methods
120 warning
130 employing the testing method with the device closed
140 comparing between the measured value and the reference value
150 evaluating a deviation
300 opening the device
310 materialographic examination
200 control examination with the device closed
210 evaluating the deviation
220 component "OK"
400 writing results into the database

The invention claimed is:

1. An inspection method for inspecting a condition of an externally invisible component of a device using a borescope, the method comprising the steps of:
a. employing a non-destructive testing method using the borescope where a physical property of at least one component region is measured, the non-destructive testing method subjecting the component region to an eddy current measurement using an eddy current probe of the borescope;
b. performing a comparison between a measured physical value obtained using the eddy current measurement and a reference physical value of the component region read from a database, the reference physical value accounting for aging of the component; and
c. evaluating a deviation of the measured physical value from the reference physical value; wherein the evaluation includes determining that the deviation is within an acceptable tolerance range, and wherein the steps a) through c) are repeated at least once for the previously examined, at least one component region using a different non-destructive testing method.

2. The inspection method as recited in claim 1 wherein once the steps a) through c) have been performed again, the evaluation includes determining that the deviation is within an acceptable tolerance range, and wherein the component is assessed as being "OK".

3. The inspection method as recited in claim 1 wherein once the steps a) through c) have been performed again, the evaluation includes determining that the deviation is outside an acceptable tolerance range, and wherein the device is opened and the component is subjected to a materialographic examination.

4. The inspection method as recited in claim 1 wherein once the steps a) through c) have been performed again, the evaluation includes determining that the deviation is within an acceptable tolerance range, and wherein a component region inaccessible to a probe of the borescope is assessed as being "OK".

5. A probe for a system having a computing unit and the probe and for performing an inspection method for inspecting a condition of an externally invisible component of a device using a borescope, the method comprising the steps of:
a. employing a non-destructive testing method using the borescope where a physical property of at least one component region is measured, the non-destructive testing method subjecting the component region to an eddy current measurement using an eddy current probe of the borescope;
b. performing a comparison between a measured physical value obtained using the eddy current measurement and a reference physical value of the component region read from a database, the reference physical value accounting for aging of the component; and
c. evaluating a deviation of the measured physical value from the reference physical value, the probe for performing on-wing inspections of engines, the probe comprising:
a gripper including a plurality of links; and
a main sensor being disposed centrally on the probe, wherein the links are lateral links having additional sensors in the form of rigid or movable inspection knobs or heads.

6. A probe for a system having a computing unit and the probe and for performing the inspection method for inspecting a condition of an externally invisible component of a device using a borescope, the method including a.
employing a non-destructive testing method using the borescope where a physical property of at least one component region is measured, the non-destructive testing method subjecting the component region to a microwave field, an ultrasonic field, X-rays, an eddy current, a thermographic analysis, a vibration or resonance analysis, or a conductivity measurement; b. performing a comparison between a measured physical value obtained using the non-destructive testing method and a reference physical value of the component region read from a database, the reference physical value accounting for aging of the component; and c. evaluating a deviation of the measured physical value from the reference physical value; the probe for performing on-wing inspections of engines, the probe comprising:
a gripper including a plurality of links; and
a main sensor being disposed centrally on the probe; wherein the links are lateral links having additional sensors in the form of rigid or movable inspection knobs or heads.

7. An inspection method for inspecting a condition of an externally invisible component of a device using a borescope, the method comprising the steps of:
a. employing a non-destructive testing method using the borescope where a physical property of at least one component region is measured, the non-destructive testing method subjecting the component region to a microwave field, an ultrasonic field, X-rays, an eddy current, a thermographic analysis, a vibration or resonance analysis, or a conductivity measurement;
b. performing a comparison between a measured physical value obtained using the non-destructive testing method and a reference physical value of the component region read from a database, the reference physical value accounting for aging of the component; and
c. evaluating a deviation of the measured physical value from the reference physical value; and
wherein the evaluation includes determining that the deviation is within an acceptable tolerance range, and wherein the steps a) through c) are repeated at least once for the previously examined, at least one component region using a different non-destructive testing method.

* * * * *